US012755189B2

(12) United States Patent
Queguiner et al.

(10) Patent No.: US 12,755,189 B2
(45) Date of Patent: Oct. 6, 2026

(54) SYSTEMS AND METHODS FOR AUTO-TIERED DATA STORAGE FOR DATA INTENSIVE APPLICATIONS

(71) Applicant: OVH, Roubaix (FR)

(72) Inventors: Jean-Louis Queguiner, Cesson-Sevigne (FR); Guillaume Ruty, Paris (FR)

(73) Assignee: OVH, Roubaix (FR)

( * ) Notice: Subject to any disclaimer, the term of this patent is extended or adjusted under 35 U.S.C. 154(b) by 996 days.

(21) Appl. No.: 17/879,835

(22) Filed: Aug. 3, 2022

(65) Prior Publication Data

US 2023/0047919 A1 Feb. 16, 2023

(30) Foreign Application Priority Data

Aug. 13, 2021 (EP) .................................... 21306119

(51) Int. Cl.
*G06N 20/00* (2019.01)
*G06F 3/06* (2006.01)

(52) U.S. Cl.
CPC ........... *G06N 20/00* (2019.01); *G06F 3/0604* (2013.01); *G06F 3/0644* (2013.01); *G06F 3/0673* (2013.01)

(58) Field of Classification Search
CPC ...... G06N 20/00; G06N 3/098; G06F 3/0604; G06F 3/0644; G06F 3/0673;
(Continued)

(56) References Cited

U.S. PATENT DOCUMENTS

2014/0006354 A1 1/2014 Parkison et al.
2016/0285881 A1* 9/2016 Huber ................. G06Q 20/405
(Continued)

FOREIGN PATENT DOCUMENTS

WO WO-2021045904 A1 * 3/2021 ............ G06N 3/045
WO WO-2021247860 A1 * 12/2021 ............ G06N 3/047
(Continued)

OTHER PUBLICATIONS

Brim et al., "Asynchronous Object Storage with QoS for Scientific and Commercial Data", U.S. Department of Energy, PDSW, Nov. 2018, 2013, 22 pages.
(Continued)

*Primary Examiner* — Omar F Fernandez Rivas
(74) *Attorney, Agent, or Firm* — BCF LLP

(57) ABSTRACT

Method and system for training a machine learning model based on a training dataset formed by data objects distributed across a virtual object storage service. The method comprises fetching from the virtual object storage service, the training dataset; copying the fetched training dataset on a first local storage device and maintaining a list of modifications executed on the training dataset that occurred on the virtual object storage service. The method comprises, upon receiving a request to initiate training of the machine learning model, generating a synchronized training dataset mirroring the training dataset stored in the virtual object storage service; storing the synchronized training dataset in a second local storage device; and fetching training data from the synchronized training dataset stored in the second local storage device as the training of the machine learning model is executed.

20 Claims, 5 Drawing Sheets

(58) Field of Classification Search
CPC ...... G06F 3/0611; G06F 3/0647; G06F 3/067; G06F 16/178; G06F 16/182; G06F 16/172
USPC .......................................................... 706/21
See application file for complete search history.

(56) References Cited

U.S. PATENT DOCUMENTS

| | | | | |
|---|---|---|---|---|
| 2019/0121889 | A1 | 4/2019 | Gold et al. | |
| 2019/0171187 | A1* | 6/2019 | Cella | G06N 3/006 |
| 2022/0075546 | A1* | 3/2022 | Potyraj | G06F 11/2048 |
| 2022/0374519 | A1* | 11/2022 | Botelho | G06F 11/1464 |

FOREIGN PATENT DOCUMENTS

| | | | | |
|---|---|---|---|---|
| WO | WO-2022011233 A1 * | 1/2022 | | G06N 3/084 |
| WO | WO-2022035578 A1 * | 2/2022 | | G06F 21/552 |
| WO | WO-2023113889 A1 * | 6/2023 | | G06Q 10/06 |

OTHER PUBLICATIONS

Maltzahn et al., "Ceph as a scalable alternative to the Hadoop Distributed File System", Login, vol. 35, No. 4, Aug. 2010, pp. 38-49.
Chard et al., "Efficient and Secure Transfer, Synchronization, and Sharing of Big Data", IEEE Cloud Computing Published by the IEEE Computer Society, Sep. 2014, pp. 46-55.
Dai et al., "Provenance-based object storage prediction scheme for scientific big data applications", ResearchGate, Conference Paper, Oct. 2014, 11 pages.
Rupprecht et al., "SwiftAnalytics—Optimizing Object Storage for Big Data Analytics", 2017 IEEE International Conference on Cloud Engineering (IC2E), Apr. 2017, 7 pages.
Gracia-Tinedo et al., "IOStack: Software-Defined Object Storage", ResearchGate, IEEE Internet Computing, May 2016, 7 pages.
Hoppli et al., "Hera Object Storage: A Seamless, Automated Multi-Tiering Solution on Top of OpenStack Swift", 2018 IEEE 8th International Symposium on Cloud and Service Computing (SC2), Nov. 2018, 8 pages.
European Search Report with regard to EP Patent Application No. 21306119.5 completed Jan. 18, 2022.
Anonymous: Data Science Virtual Machines Microsoft Azure, Oct. 6, 2017, retrieved from https://web.archive.org/web/20171006072159/https://azure.microsoft.com/en-us/services/virtual-machines/data-science-virtual-machines/ on Jan. 18, 2022, 15 pages.
Uddin, "Virtualization for Machine Learning", Towards Data Science, Jul. 28, 2021, retrieved from https://towardsdatascience.com/virtualization-for-machine-learning-da11b7a59070 on Jan. 18, 2022, 8 pages.
EPO Communication with regard to the counterpart EP Patent Application No. 21306119.5 dated Dec. 15, 2023.
Communication with regard to the EP Patent Application No. 21306119.5 mailed Jan. 25, 2023.
Anonymous: "Cache hierarchy—Wikipedia", Nov. 6, 2020, XP093015622, Retrieved from the Internet: URL: https://web.archive.org/web/20201106232559/https://en.wikipedia.org/ wiki/Cache_hierarchy, pdf 9 pages.
Lutkevich Ben: "What is Cache Memory? Cache Memory in Computers, Explained", Feb. 28, 2020, XP093015623, Retrieved from the Internet: URL:https://www.techtarget.com/searchstorage/definition/cache-memory, pdf 7 pages.

* cited by examiner

SYSTEMS AND METHODS FOR AUTO-TIERED DATA STORAGE FOR DATA INTENSIVE APPLICATIONS

REFERENCE TO FIELD

The present application claims priority to European Patent Application EP21306119.5, which was filed Aug. 13, 2021, the disclosure of which is incorporated by reference herein in its entirety.

FIELD

The present technology relates to systems and methods for automatic data storage. In particular, a system and methods for auto-tiered data storage for intensive applications are disclosed.

BACKGROUND

Virtual object storage services have recently gained traction in data intensive applications involving high amount of heterogeneous and rapidly changing data such as, for example, scientific big data applications in academia and industry. Object storage provides applications basic storage unit as "data object", or simply "object", which is a logic collection of bytes associated with metadata on an object storage device. Such virtual object storage services are usually coupled with an Application Programming Interface (API) to provide efficient data object manageability. A user may access an object storage via the API by transmitting a request comprising, for example, an identifier of the desired data object. Based on said request, the API selects the desired data object to be provided to the user by comparing the identifier to information comprised in the metadata of the data objects. The API may then provide the user with the desired data object.

However, such configuration become rapidly inefficient for data intensive applications where high amount of data object is required. Indeed, APIs bring non-neglectable overhead which leads to high processing time, causing a user to wait until the data objects are retrieved by the API due to relatively high-latency data access. Notably, as an example, such systems may not be suitable for training of models using Machine Learning Algorithms (MLA) with training datasets comprising Terabytes of data objects. Indeed, providing a Graphics Processing Unit (GPU) with data objects retrieved by a Central Computing Unit (CPU) from a virtual object storage services requires the CPU to request for data objects, causing a transfer of sets of data objects (e.g. sets of 32 images for examples), such that the set of data objects may be processed by the GPU before being provided by another set. Computing capacities of the GPU are thus underused. Many technologies attempted to address this problem by using file systems which cannot provide multi-tenancy features to the users and/or synchronizing the data object distributed across the virtual object storage service on a high-performance storage device with low-latency data access but does not provide continuous or quasi-continuous synchronization with the virtual object storage service.

Even though the recent developments identified above may provide benefits, improvements are still desirable.

SUMMARY

Embodiments of the present technology have been developed based on developers' appreciation of shortcomings associated with the prior art. It should be noted that solutions relying on filesystems storage device for intensive data applications disregard data manageability and multi-tenancy (i.e. access to data objects by multiple users) considerations when dealing with users' data.

Moreover, a distinction in the data management can be made based on how often data are accessed. A data temperature model classifies data storage devices according to a frequency of accessing data hosted thereby. "Hot" and "cold" data storage devices respectively host data that are very frequently and rarely accessed by users. Therefore, hot data storage devices are usually the best performing devices and are relatively more expensive than low-performing cheaper cold local storage devices. Optimizing the data storage allocations based on the temperature model is know as "multi-tiered storage". Automation of such allocations is also known as "auto-tiering".

Developers of the present technology have devised methods and servers for training a machine learning model based on a training dataset, the training dataset being formed by data objects distributed across a virtual object storage service. In one embodiment, the method comprises fetching, by a server, from the virtual object storage service, the training dataset and storing the fetched training dataset in a first local storage device. In other words, the fetched training dataset is stored in a first storage device that is in direct communication with the server. The method further comprises maintaining a list of modification made the training dataset distributed across the virtual object storage service that occurred since the fetched training dataset has been stored on the first local storage device. Upon receiving a request to initiate training of the machine learning model, a synchronized training dataset is generated based on the fetched training dataset and the list of modifications, the synchronized training dataset mirroring the training dataset stored in the virtual object storage service. The synchronized training dataset is further stored in a second local storage device such that training data is fetched from the synchronized training dataset as the training of the machine learning model is executed.

It can be said that the training dataset is "synchronized" on the second local storage device. As it will be understood, the second local storage device has the highest performances in terms of latency compared to the first local storage device. As such, the first and second local storage devices will be referred to as the "hot" and "cold" local storage devices respectively herein after.

Developers of the present technology have realized that such synchronization of the training dataset distributed across the virtual object storage service on the hot local storage device does not require independent provision of every data object of the training dataset from the object storage device, which may be a highly time-consuming task. As mentioned above, the data objects may be accessed by the user device using high-performance storage capabilities of the hot local storage device for, for example, training models based on Machine Learning Algorithms using the data objects as training datasets. For instance, high-performance storage capabilities may be desirable to rapidly fill a memory such as a Video Random Access Memory (VRAM) of a Graphics Processing Unit (GPU) with training datasets, in particular when said training dataset comprises audio signals or any other time-sensitive information.

The server, the hot and cold local storage devices and the object storage device may be referred to as a data management system. In at least some embodiments of the present technology, the data management system may be a "commercially-oriented" data management system. Broadly speaking, a given commercially-oriented data management system may be of use to users that desire to access a pool of data objects via a respective user device. For example, the users may seek for training a model, accessing and/or modifying data objects of the training dataset. Hence, users of such a system may be provided with high-performance storage capabilities for storing the synchronized training dataset and synchronize it with a content of the object storage device while being used by the user for training a model in this example. The data management system may further enable to rely on hot local storage devices only when the training dataset is to be accessed.

In a first broad aspect of the present technology, there is provided a method for training a machine learning model based on a training dataset. The training dataset is formed by data objects distributed across a virtual object storage service. The method is executable by a server configured to access the virtual object storage service. The method comprises: fetching, by the server, from the virtual object storage service, the training dataset; copying the fetched training dataset on a first local storage device, the first local storage device being communicably connected to the server and maintaining, by the server, a list of modifications executed on the training dataset that occurred on the virtual object storage service since the fetched training dataset has been stored on the first local storage device. Each entry of the list of modifications comprises at least of an identifier of a data object of the training dataset, a type of modification made to the data object and/or a temporal indication associated with a modification made to the data object. The method further comprises, upon receiving, by the server, a request to initiate training of the machine learning model, generating a synchronized training dataset based on the fetched training dataset copied on the first local storage device and the list of modifications, the synchronized training dataset mirroring the training dataset stored in the virtual object storage service; storing the synchronized training dataset in a second local storage device, the second local storage device being communicably connected to the server ( ), the second local storage device having a lower data retrieval latency than the first local storage device; and fetching training data from the synchronized training dataset stored in the second local storage device as the training of the machine learning model is executed.

In some embodiment of the present technology, generating the synchronized training dataset based on the fetched training dataset and the list of modifications comprises copying the fetched training dataset as a whole from the first local storage device to the second local storage device, and modify the generated copy in the second local storage device based on relevant entries of the list of modifications, the relevant entries being indicative of modifications executed after a storing the fetched training dataset in a first local storage device.

In some embodiments of the present technology, generating the synchronized training dataset based on the fetched training dataset and the list of modifications comprises identifying, by the server, based on the list of modifications, a first set of data objects of the training dataset, the data objects of the first set of data objects having been subject to a modification since the storing of the fetched training dataset in the first local storage device; identifying, by the server, based on the list of modifications, a second set of data objects of the training dataset, the data objects of the second set of data objects having not been subject to a modification since the storing of the fetched training dataset in the first local storage device; fetching the first set of data objects from the virtual object storage service and fetching the second set of data objects from the first local storage device. A storing the synchronized training dataset in a second local storage device comprises storing the fetched first and second set of data objects in the second local storage device.

In some embodiments of the present technology, generating the synchronized training dataset based on the fetched training dataset and the list of modifications comprises identifying, by the server, based on the list of modifications, a first set of data objects of the training dataset, the data objects of the first set of data objects having been subject to a modification since the storing of the fetched training dataset in the first local storage device and executing, by the server, modifications of the list of modifications that correspond to relevant entries of the list of modifications on corresponding data objects of a copy of the fetched training dataset, the relevant entries being indicative of modifications executed after a storing the fetched training dataset in a first local storage device.

In some embodiments of the present technology, the modifications are CREATE operations, indicative of a creation, by the server, of a new data object in the training dataset, WRITE operations, indicative of a modification, by the server, of one of the data objects of the training dataset, READ operations, indicative of an retrieval, by the server, of one of the data objects of the training dataset, DELETE operations, indicative of a deletion, by the server, of one of the data objects of the training dataset, or a combination thereof.

In some embodiments of the present technology, the method further comprises, subsequent to executing the training of the machine learning model, discarding the synchronized training dataset from the second local storage device.

In some embodiments of the present technology, the machine learning model is a first machine learning model, the training dataset is a first training dataset, the synchronized training dataset is a first synchronized training dataset, the list of modification is a first list of modifications, and the virtual object storage service comprises second data objects distributed thereacross forming a second training dataset. The method further comprises, subsequent to discarding the synchronized training dataset from the second local storage device, fetching, by the server, from the virtual object storage service, the second training dataset; storing the fetched second training dataset in the first local storage device, the first local storage device being communicably connected to the server; maintaining, by the server, a second list of modifications executed on the second training dataset distributed across the virtual object storage service that occurred since the fetched second training dataset has been stored on the first local storage device, each entry of the second list of modifications comprising at least one of an identifier of a data object of the second training dataset, a type of modification made to said data object and/or a temporal indication associated with a modification made to said data object and, upon receiving, by the server, a request to initiate training of the second machine learning model, generating a second synchronized training dataset based on the fetched second training dataset and the second list of modifications. The second synchronized training dataset mirrors the second training dataset stored in the virtual object storage service. The method further comprises, subsequently to discarding the first synchronized training dataset from the second storage device, storing the second synchronized training dataset in the second local storage device and fetching training data from the second synchronized training dataset stored in the second local storage device as the training of the second machine learning model is executed.

In some embodiments of the present technology, the training of the first machine learning model is executed in response to receiving, by the server, a first request signal from a first user device associated with a first user, and the training of the second machine learning model is executed in response to receiving, by the server, a second request signal from a second user device associated with a second user.

In some embodiments of the present technology, the server and the virtual object storage service are communicably connected to a user device associated with a user, the generation of the synchronized training dataset on the second storage device resulting from the reception, by the server, of the request signal for training the machine learning model emitted by the user device.

In some embodiments of the present technology, the user device is a plurality of user devices, each user device being associated with a distinct user and a corresponding training dataset distributed across the virtual object storage service.

In some embodiments of the present technology, each data object of the training dataset distributed across the virtual object storage service is associated with an identifier, and maintaining, by the server, a list of modifications executed on the training dataset comprises transmitting, from the server to the virtual object storage service, a WRITE signal comprising information indicative of a modification by a user device of a data object of the training dataset, the user device being communicably connected to the server, the information comprising a first identifier of the data object; storing, by the server, the first identifier of the data object in a memory communicably connected to the server; transmitting, by the server, instructions causing the virtual object storage service to execute a modification of the data object based on the information of the WRITE signal, receiving, by the server from the virtual object storage, data comprising information about a second identifier of a data object on which the modification is executed and generating, by the server, a new entry in the list of modifications, the new entry being indicative of the identifier of the data object and the information of the WRITE signal. If determination is made, by the server, that the first and second identifiers are identical, the method comprises transmitting an acknowledge signal to the user device indicative of a successful modification of the data object.

In some embodiments of the present technology, fetching, by the server, from the virtual object storage service, the training dataset comprises generating a snapshot of the virtual object storage service, and storing the fetched training dataset in the first local storage device comprises storing the snapshot in the first local storage device, the list of modification being indicative of modifications executed on the training dataset distributed across the virtual object storage service since the generation of the snapshot.

In some embodiments of the present technology, the snapshot is updated at a predetermined frequency by generating a new snapshot of the training dataset.

In some embodiments of the present technology, the snapshot is updated when a number of new entries in the list of modifications is above a first threshold.

In some embodiments of the present technology, the training of the machine learning model is executed by a dedicated processing unit communicably connected to a memory configured for receiving the fetched synchronized training dataset, the memory being communicably connected to the second local storage device.

In some embodiments of the present technology, the training of the machine learning model is executed by a Graphics Processing Unit (GPU), the GPU being communicably connected to a Video Random Access Memory (VRAM) configured for receiving the fetched synchronized training dataset, the VRAM being communicably connected to the second local storage device.

In a second broad aspect of the present technology, there is provided a server for training a machine learning model based on a training dataset, the training dataset being formed by data objects distributed across a virtual object storage service, the server being configured to access the virtual object storage service, the server comprising a processor and a memory configured to store instructions which, upon being executed by the processor, cause the server to perform the method.

In some embodiments of the present technology, the server is further configured to, in order to generate the synchronized training dataset based on the fetched training dataset and the list of modifications, identify based on the list of modifications, a first set of data objects of the training dataset, the data objects of the first set of data objects having been subject to a modification since the storing of the fetched training dataset in the first local storage device; identify, based on the list of modifications, a second set of data objects of the training dataset, the data objects of the second set of data objects having not been subject to a modification since the storing of the fetched training dataset in the first local storage device; fetch the first set of data objects from the virtual object storage service and fetch the second set of data objects from the first local storage device. In order to store the synchronized training dataset in a second local storage device, the server is further configured to store the fetched first and second set of data objects in the second local storage device.

In some embodiments of the present technology, the server is further configured to, in order to generate the synchronized training dataset based on the fetched training dataset and the list of modifications, identify, based on the list of modifications, a first set of data objects of the training dataset, the data objects of the first set of data objects having been subject to a modification since the storing of the fetched training dataset in the first local storage device; and execute modifications of the list of modifications that correspond to relevant entries of the list of modifications on corresponding data objects of a copy of the fetched training dataset, the relevant entries being indicative of modifications executed after a storing the fetched training dataset in a first local storage device.

In some embodiments of the present technology, the modifications are CREATE operations, indicative of a creation, by the server, of a new data object in the training dataset, WRITE operations, indicative of a modification, by the server, of one of the data objects of the training dataset, READ operations, indicative of an retrieval, by the server, of one of the data objects of the training dataset, DELETE operations, indicative of a deletion, by the server, of one of the data objects of the training dataset, or a combination thereof.

In some embodiments of the present technology, the server is further configured to, subsequent to executing the training of the machine learning model, discard the synchronized training dataset from the second local storage device.

In some embodiments of the present technology, the machine learning model is a first machine learning model, the training dataset is a first training dataset, the synchronized training dataset is a first synchronized training dataset, and the list of modification is a first list of modifications, and the virtual object storage service comprises second data objects distributed thereacross forming a second training dataset, the server being further configured to, subsequent to discarding the synchronized training dataset from the second local storage device, fetch, from the virtual object storage service, the second training dataset; store the fetched second training dataset in the first local storage device, the first local storage device being communicably connected to the server and maintain a second list of modifications executed on the second training dataset distributed across the virtual object storage service that occurred since the fetched second training dataset has been stored on the first local storage device, each entry of the second list of modifications comprising at least one of an identifier of a data object of the second training dataset, a type of modification made to said data object and/or a temporal indication associated with a modification made to said data object. The server is further configured to, upon receiving a request to initiate training of a second machine learning model, generate a second synchronized training dataset based on the fetched second training dataset and the second list of modifications, the second synchronized training dataset mirroring the second training dataset stored in the virtual object storage service; subsequently to discarding the first synchronized training dataset from the second storage device, store the second synchronized training dataset in the second local storage device; and fetch training data from the second synchronized training dataset stored in the second local storage device as the training of the second machine learning model is executed.

In some embodiments of the present technology, the training of the first machine learning model is executed in response to receiving, by the server, a first request signal from a first user device associated with a first user, and the training of the second machine learning model is executed in response to receiving, by the server, a second request signal from a second user device associated with a second user.

In some embodiments of the present technology, the server and the virtual object storage service are communicably connected to a user device associated with a user, the generation of the synchronized training dataset on the second storage device resulting from the reception, by the server, of the request signal for training the machine learning model emitted by the user device.

In some embodiments of the present technology, the user device is a plurality of user devices, each user device being associated with a distinct user and a corresponding training dataset distributed across the virtual object storage service.

In some embodiments of the present technology, each data object of the training dataset distributed across the virtual object storage service is associated with an identifier. In order to maintain a list of modifications executed on the training dataset, the server is further configured to transmit, to the virtual object storage service, a WRITE signal comprising information indicative of a modification by a user device of a data object of the training dataset, the user device being communicably connected to the server, the information comprising a first identifier of the data object; store the first identifier of the data object in a memory communicably connected to the server; transmit instructions causing the virtual object storage service to execute a modification of the data object based on the information of the WRITE signal; receive, from the virtual object storage, data comprising information about a second identifier of a data object on which the modification is executed; and generate, a new entry in the list of modifications, the new entry being indicative of the second identifier of the data object and the information of the WRITE signal. If determination is made, by the server, that the first and second identifiers are identical, the server is further configured to transmit an acknowledge signal to the user device indicative of a successful modification of the data object.

In some embodiments of the present technology, the server is further configured to, in order to fetch the training dataset from the virtual object storage service, generate a snapshot of the virtual object storage service. In order to store the fetched training dataset in the first local storage device, the server is further configured to store the snapshot in the first local storage device, the list of modification being indicative of modifications executed on the training dataset distributed across the virtual object storage service since the generation of the snapshot.

In some embodiments of the present technology, the server is configured to update the snapshot at a predetermined frequency by generating a new snapshot of the training dataset.

In some embodiments of the present technology, the snapshot is updated when a number of new entries in the list of modifications is above a first threshold.

In some embodiments of the present technology, the training of the machine learning model is executed by a dedicated processing unit communicably connected to a memory configured for receiving the fetched synchronized training dataset, the memory being communicably connected to the second local storage device.

In a third broad aspect of the present technology, there is provided a method for providing a user device with access to a dataset, the dataset being formed by data objects distributed across a virtual object storage service, the method being executable by a server communicably connected to the user device and configured to access the virtual object storage service. The method comprises fetching, by the server, from the virtual object storage service, the dataset; copying the fetched dataset on a first local storage device, the first local storage device being communicably connected to the server; maintaining, by the server, a list of modifications executed on the dataset distributed across the virtual object storage service that occurred since the fetched dataset has been stored on the first local storage device, each entry of the list of modifications comprising at least one of an identifier of a data object of the dataset, a type of modification made to the data object and/or a temporal indication associated with a modification made to the data object; upon receiving, by the server from the user device, a request to access the dataset, generating a synchronized dataset based on the fetched dataset copied on the first local storage device and the list of modifications, the synchronized dataset mirroring the dataset stored in the virtual object storage service; storing the synchronized dataset in a second local storage device; and fetching data from the synchronized dataset stored in the second local storage device as the access to the dataset is provided to the user device.

In the context of the present specification, a "server" is a computer program that is running on appropriate hardware and is capable of receiving requests (e.g., from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "user device" is any computer hardware that is capable of running software appropriate to the relevant task at hand. Thus, some (non-limiting) examples of user devices include personal computers (desktops, laptops, netbooks, etc.), smartphones, and tablets, as well as network equipment such as routers, switches, and gateways. It should be noted that a device acting as a user device in the present context is not precluded from acting as a server to other user devices. The use of the expression "a user device" does not preclude multiple user devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, lists of words, etc.

In the context of the present specification, the expression "component" is meant to include software (appropriate to a particular hardware context) that is both necessary and sufficient to achieve the specific function(s) being referenced.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, unless expressly provided otherwise, an "indication" of an information element may be the information element itself or a pointer, reference, link, or other indirect mechanism enabling the recipient of the indication to locate a network, memory, database, or other computer-readable medium location from which the information element may be retrieved. For example, an indication of a document could include the document itself (i.e. its contents), or it could be a unique document descriptor identifying a data object with respect to a particular object storage device, or some other means of directing the recipient of the indication to a network location, memory address, database table, or other location where the data object may be accessed. As one skilled in the art would recognize, the degree of precision required in such an indication depends on the extent of any prior understanding about the interpretation to be given to information being exchanged as between the sender and the recipient of the indication. For example, if it is understood prior to a communication between a sender and a recipient that an indication of an information element will take the form of a database key for an entry in a particular table of a predetermined database containing the information element, then the sending of the database key is all that is required to effectively convey the information element to the recipient, even though the information element itself was not transmitted as between the sender and the recipient of the indication.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned objects and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

Figure 1:
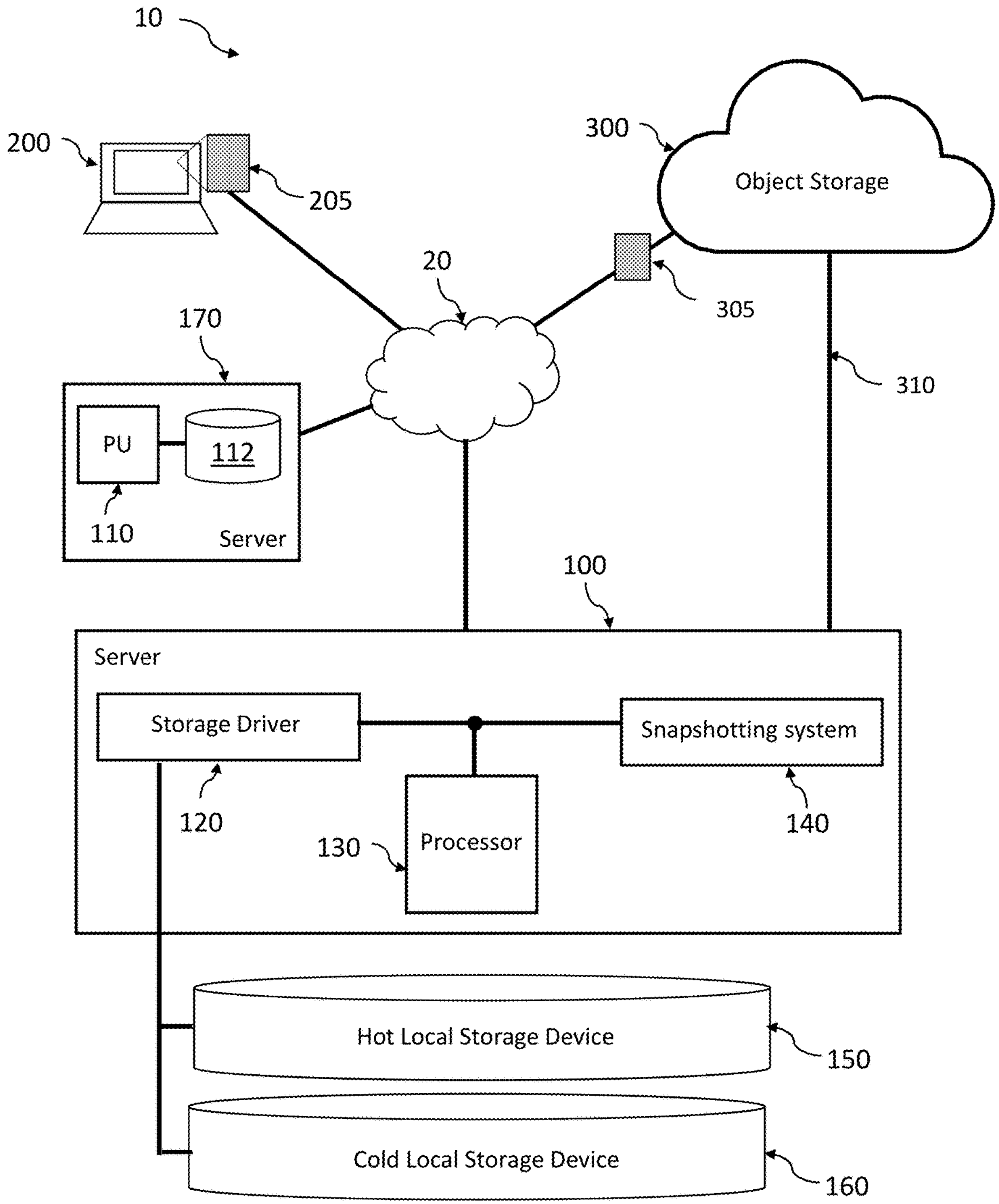
FIG. 1 is a schematic representation of data management environment in accordance with non-limiting embodiments of the present technology.

It should also be noted that, unless otherwise explicitly specified herein, the drawings are not to scale.

DETAILED DESCRIPTION

The examples and conditional language recited herein are principally intended to aid the reader in understanding the principles of the present technology and not to limit its scope to such specifically recited examples and conditions. It will be appreciated that those skilled in the art may devise various arrangements that, although not explicitly described or shown herein, nonetheless embody the principles of the present technology.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes that may be substantially represented in non-transitory computer-readable media and so executed by a computer or processor, whether or not such computer or processor is explicitly shown.

The functions of the various elements shown in the figures, including any functional block labeled as a "processor" or "processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general-purpose processor, such as a central processing unit (CPU) or a processor dedicated to a specific purpose, such as a digital signal processor (DSP). Moreover, explicit use of the term a "processor" should not be construed to refer exclusively to hardware capable of executing software, and may implicitly include, without limitation, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown. Moreover, it should be understood that module may include for example, but without being limitative, computer program logic, computer program instructions, software, stack, firmware, hardware circuitry or a combination thereof which provides the required capabilities.

With these fundamentals in place, we will now consider some non-limiting examples to illustrate various implementations of aspects of the present technology.

Referring to FIG. 1, there is shown a schematic diagram of a system 10, the system 10 being suitable for implementing non-limiting embodiments of the present technology. It is to be expressly understood that the system 10 as depicted is merely an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 10 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e., where no examples of modifications have been set forth), it should not be interpreted that no modifications are possible and/or that what is described is the sole manner of implementing that element of the present technology. As a person skilled in the art would understand, this is likely not the case. In addition, it is to be understood that the system 10 may provide in certain instances simple implementations of the present technology, and that where such is the case they have been presented in this manner as an aid to understanding. As persons skilled in the art would understand, various implementations of the present technology may be of a greater complexity.

Generally speaking, the system 10 is configured to provide a device with a synchronized pool of data objects mirroring a pool of data objects distributed across a virtual object storage service, the synchronized pool of data objects being stored in a hot local storage device such that the device may access the synchronized pool of data objects using the high-performance storage capabilities of the hot local storage device. The pool of data objects may be, for example, a training dataset formed of data objects.

With reference to FIG. 1, an electronic device 200 may transmit a request to a server 100 for accessing the pool of data objects distributed across a virtual object storage service 300, the electronic device 200, the server 100 and the virtual object storage service 300 being communicably interconnected via a communication network 20. As it will be described in greater details hereinafter, the server 100 may generate a synchronized pool of data objects on a hot local storage device 150 and update said synchronized pool such that it mirrors the current pool of data objects distributed across the virtual object storage service 300. As such, any system variation configured to enable synchronization and/or provision of a pool of data objects on a hot local storage device or, more generally, enable multi-tiering and/or auto-tiering for managing data affectation can be adapted to execute embodiments of the present technology, once teachings presented herein are appreciated. Furthermore, the system 10 will be described using an example of the system 10 being a data management system (therefore, the system 10 can be referred to herein below as a "data management system 10") where the pool of data object is referred to as a "training dataset", the data object forming training data for training of a machine learning model. However, embodiments of the present technology can be equally applied to other types of the system 10 and for other purposes than training of machine learning models, as will be described in greater detail herein below. In this embodiment, the data management system 10 comprises a resource server 170 communicably connected to the virtual object storage service 300, the electronic device 200, the server 100 and the virtual object storage service 300. As will be described herein further below, the resource server 170 may comprise processing resources to train a machine learning algorithm based on the training dataset. It is contemplated that said processing resources may be hosted by the server 100, the electronic device 200, another device communicably connected to the communication network 20 suitable for training of a machine learning algorithm or distributed across a plurality of such devices.

Electronic Device

The system 10 comprises at least one electronic device 200, the electronic device 200 being associated with a respective user. As such, the electronic device 200 can sometimes be referred to as a "client device", "user device" or "client electronic device". It should be noted that the fact that the electronic device 200 is associated with a user does not need to suggest or imply any mode of operation—such as a need to log in, a need to be registered, or the like. It should be appreciated that in other embodiments, the system 10 can include additional users and user devices.

The implementation of the electronic device 200 is not particularly limited, but as an example, the electronic device 200 may be implemented as a personal computer (desktops, laptops, netbooks, etc.), a wireless communication device (such as a smartphone, a cell phone, a tablet and the like), as well as network equipment (such as routers, switches, and gateways). The electronic device 200 comprises hardware and/or software and/or firmware (or a combination thereof), as is known in the art, to execute a communication application 205. Generally speaking, the purpose of the communication application 205 is to enable the user to communicate with the virtual object storage service 300 and the server 100 to transmit, for example, request for accessing the training dataset as will be described in greater detail herein below. As such, the electronic device 200 of FIG. 1 may include any type of computing device that enables users to transmit to and receive information from the server 100 and/or the virtual object storage service 300.

The communication application 205 may be, for example and without limitations, an Application Programming Interface (API), a website, a web application or an application. In one embodiment, the user device 200 receives the communication application 205 from an entity that enables a user to download an application onto their devices, such as the server 100. In this embodiment, the communication application may comprise information about an identification of the user device 200 such that the server 100 and/or the virtual object storage service 300 may distinguish between the different user device communicably connected thereto. It should be understood that, upon sending a request or any other form of signal to the server 100 and/or to the virtual object storage service 300, a given user device 200 is configured to indicate said identification in the transmitted signal such that the server 100 and/or to the virtual object storage service 300 transmit information in response back to the given user device 200.

It should be understood that the communication application 205 and/or one or more functions thereof may be part of another application on the user device 200. For example, the communication application 205 may be part of a data management application providing manageability of data to a respective user.

It should be appreciated that different types of the communication application may be transmitted based on the type of user device. For instance, a smartphone user device may receive an application configured to operate on a smartphone while a personal computer user device may receive an application configured to operate on a personal computer.

Figure 2:
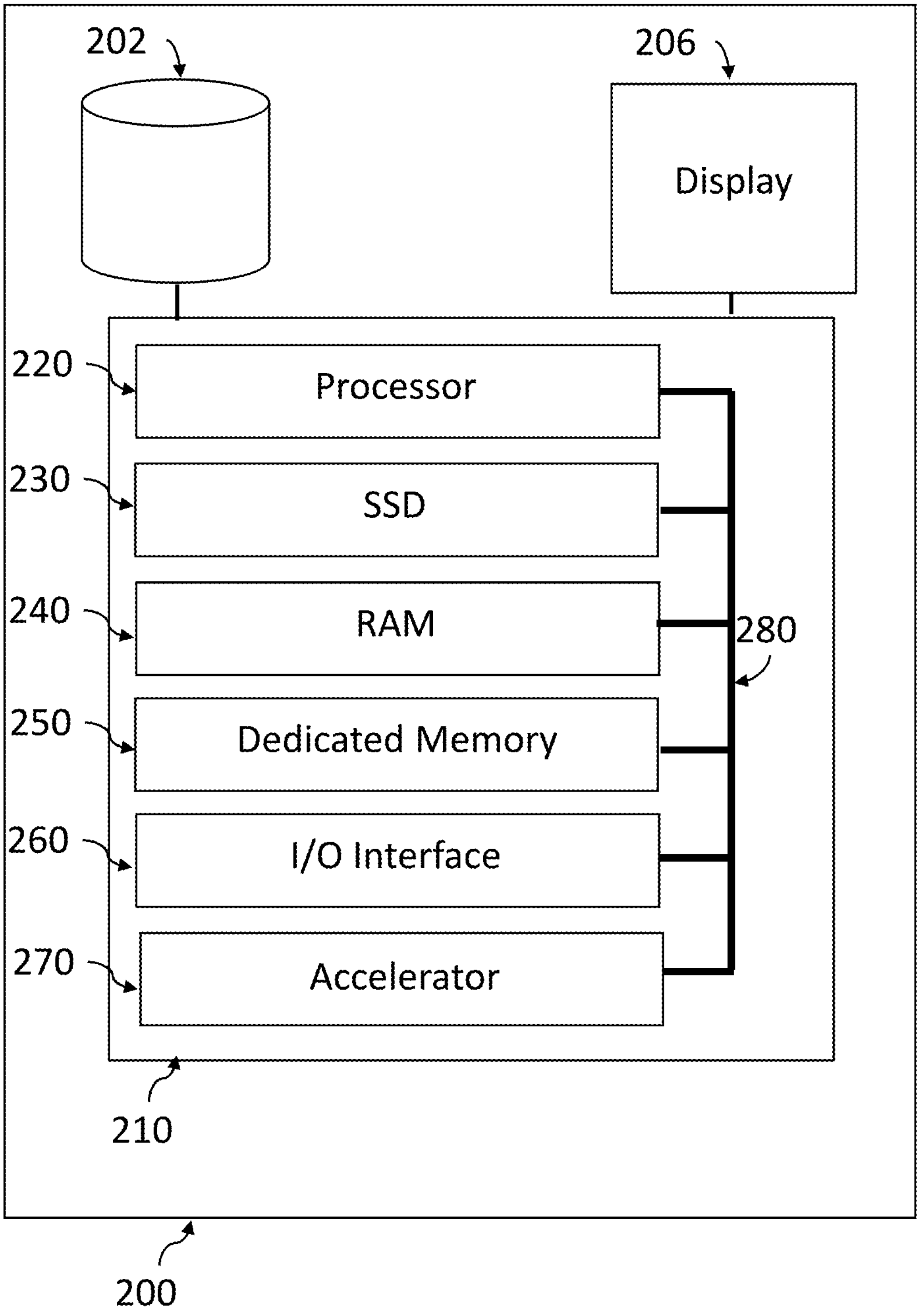
FIG. 2 is a schematic representation of a user device configured for communicating with a data management system in accordance with an embodiment of the present technology.

FIG. 2 is a schematic representation of the user device 200 in accordance with an embodiment of the present technology. The user device 200 may be configured to execute the communication application 205. To do so, the user device 200 comprises a computing unit 210. In some embodiments, the computing unit 210 may be implemented by any of a conventional personal computer, a controller, and/or an electronic device (e.g., a server, a controller unit, a control device, a monitoring device etc.) and/or any combination thereof appropriate to the relevant task at hand. In some embodiments, the computing unit 210 comprises various hardware components including one or more single or multi-core processors collectively represented by a processor 220, a solid-state drive 230, a RAM 240, a dedicated memory 250 and an input/output interface 260. The computing unit 210 may be a generic computer system.

In some other embodiments, the computing unit 210 may be an "off the shelf" generic computer system. In some embodiments, the computing unit 210 may also be distributed amongst multiple systems. The computing unit 210 may also be specifically dedicated to the implementation of the present technology. As a person in the art of the present technology may appreciate, multiple variations as to how the computing unit 210 is implemented may be envisioned without departing from the scope of the present technology.

Communication between the various components of the computing unit 210 may be enabled by one or more internal and/or external buses 280 (e.g. a PCI bus, universal serial bus, IEEE 1394 "Firewire" bus, SCSI bus, Serial-ATA bus, ARINC bus, etc.), to which the various hardware components are electronically coupled.

The input/output interface 260 may provide networking capabilities such as wired or wireless access. As an example, the input/output interface 260 may comprise a networking interface such as, but not limited to, one or more network ports, one or more network sockets, one or more network interface controllers and the like. Multiple examples of how the networking interface may be implemented will become apparent to the person skilled in the art of the present technology. For example, but without being limitative, the networking interface may implement specific physical layer and data link layer standard such as Ethernet, Fibre Channel, Wi-Fi or Token Ring. The specific physical layer and the data link layer may provide a base for a full network protocol stack, allowing communication among small groups of computers on the same local area network (LAN) and large-scale network communications through routable protocols, such as Internet Protocol (IP).

According to implementations of the present technology, the solid-state drive 230 stores program instructions suitable for being loaded into the RAM 240 and executed by the processor 220. Although illustrated as a solid-state drive 230, any type of memory may be used in place of the solid-state drive 230, such as a hard disk, optical disk, and/or removable storage media.

The processor 220 may be a general-purpose processor, such as a central processing unit (CPU) or a processor dedicated to a specific purpose, such as a digital signal processor (DSP). In some embodiments, the processor 220 may also rely on an accelerator 270 dedicated to certain given tasks, such as executing the methods set forth in the paragraphs below. In some embodiments, the processor 220 or the accelerator 270 may be implemented as one or more field programmable gate arrays (FPGAs). Moreover, explicit use of the term "processor", should not be construed to refer exclusively to hardware capable of executing software, and may implicitly include, without limitation, application specific integrated circuit (ASIC), read-only memory (ROM) for storing software, RAM, and non-volatile storage. Other hardware, conventional and/or custom, may also be included.

Further, the user device 200 may include a screen or display 206 capable of rendering an interface of the communication application 205. In some embodiments, display 206 may comprise and/or be housed with a touchscreen to permit users to input data via some combination of virtual keyboards, icons, menus, or other Graphical User Interfaces (GUIs). In some embodiments, display 206 may be implemented using a Liquid Crystal Display (LCD) display or a Light Emitting Diode (LED) display, such as an Organic LED (OLED) display. The device may be, for example and without being limitative, a handheld computer, a personal digital assistant, a cellular phone, a network device, a smartphone, a navigation device, an e-mail device, a game console, or a combination of two or more of these data processing devices or other data processing devices.

The user device 200 may comprise a memory 202 communicably connected to the computing unit 210 and configured to store data, settings of the communication application 205, or any other information relevant for running the communication application on the user device 200. The memory 202 may be embedded in the user device 200 as in the illustrated embodiment of FIG. 2 or located in an external physical location. Information representative of the communication application 205 may be store in the memory 202. The computing unit 210 may be configured to access a content of the memory 202 via a network (not shown) such as a Local Area Network (LAN) and/or a wireless connexion such as a Wireless Local Area Network (WLAN).

The user device 200 may also includes a power system (not depicted) for powering the various components. The power system may include a power management system, one or more power sources (e.g., battery, alternating current (AC)), a recharging system, a power failure detection circuit, a power converter or inverter and any other components associated with the generation, management and distribution of power in mobile or non-mobile devices.

Object Storage Device

Returning to the description of FIG. 1, the user device 200 is communicably connected to the virtual object storage service 300, the virtual object storage service 300 being configured to host the training dataset. As previously described, each data object of the training dataset may include respective data itself, metadata, and a globally unique identifier. The virtual object storage service 300 may be part of a cloud storage for providing user with storage capabilities such as OVHCLOUD PUBLIC CLOUD STORAGE, AMAZON S3, MICROSOFT AZURE BLOB STORAGE, OpenStack SWIFT, GOOGLE CLOUD STORAGE or any other cloud storage architecture. Even though the virtual object storage service 300 is depicted as being a single component in FIG. 1, it should be understood that the virtual object storage service 300 may comprise, for instance, a plurality of object storage devices such as servers for storing data objects or fragments of data objects. As such, functionalities of the virtual object storage service 300 as described herein may be distributed between more than one device. For instance, the training dataset distributed across the virtual object storage service 300 may be stored using known erasure coding technologies such that data objects are fractioned into fragments, the fragments being spread and stored across different object storage devices (e.g. different disks). It should also be understood that the virtual object storage service 300 may store a plurality of training datasets.

In this embodiment, the virtual object storage service 300 is coupled with a gateway 305 for receiving, managing and emitting signals involving the virtual object storage service 300 and/or a content thereof. For example, the gateway 305 may be an API gateway in collaboration of the communication application 205. More specifically, the communication application 205 may be an API and the gateway may be a corresponding API gateway configured to configured for receiving request signals from the API 205, aggregating services (e.g. data objects or operations to be executed on data objects), and returning appropriated results.

Developers of the present technology have realized that low latency for accessing data objects of the virtual object storage service 300 is beneficial for users of the system 10 for ensuring efficiency processing of the data objects. The API gateway 305 may cause such latency to increase due to processing time of request signals, providing appropriated response signals and managing said signals. The present technology may be used to provide lower latency for accessing data of the virtual object storage service 300.

Communication Network

The user device 200, the server 100 and the virtual object storage service 300 are communicatively coupled one to another over a communication network 20 via any wired or wireless communication link including, for example, 4G, LTE, Wi-Fi, or any other suitable connection. In some non-limiting embodiments of the present technology, the communication network 20 may be implemented as the Internet. In other embodiments of the present technology, the communication network 20 can be implemented differently, such as any wide-area communication network, local-area communication network, a private communication network and the like.

How the communication links between the user device 200, the server 100 and the virtual object storage service 300 are implemented will depend inter alia on how the user device 200, the server 100 and the virtual object storage service 300 are implemented. Merely as an example and not as a limitation, in those embodiments of the present technology where user device 200 are implemented as wireless communication devices (such as smartphones), the communication link between the user device 200 and the server 100 can be implemented as a wireless communication link (such as but not limited to, a 3G communication network link, a 4G communication network link, Wireless Fidelity, or WiFi® for short, Bluetooth® and the like). In those examples where one of the user device 200 is implemented as a notebook computer, the corresponding communication link can be either wireless (such as Wireless Fidelity, or WiFi® for short, Bluetooth® or the like) or wired (such as an Ethernet based connection).

The communication network 20 is configured to transmit information and/or computer-readable instructions between the user device 200, the server 100 and the virtual object storage service 300. For example and without limitations, a request for accessing a data object stored in the virtual object storage service 300 may be generated by the user device 200 and further transmitted over the communication network 20 to the server 100. As another example, the user device 200 and/or the server 100 may generate a computer-readable instruction comprising information about a modification, or "operation", to be executed on one or more of the data objects of the virtual object storage service 300. Said instruction may comprise information for executing:

- a READ operation, indicative of a desire of the user to access the one or more of the data objects;
- a WRITE operation, or "UPDATE" modification, indicative of a desire of the user to edit the one or more data objects (i.e. modify the logic collection of bytes of the one or more data objects);
- a CREATE operation, indicative of a desire of the user to generate a new data object in the training dataset stored in the virtual object storage service 300;
- a DELETE operation, indicative of a desire of the user to delete the one or more data objects;
- or any other operation that may be executed on data objects stored in the virtual object storage service 300.

As yet another example, the virtual object storage service 300, as it will be described in greater details herein further below, may generate acknowledge signals indicative of a confirmation that an operation has been executed on a data object stored therein. Said acknowledge signal may be transmitted by the virtual object storage service 300 to the server 100. Similarly, the server 100 may generates and further transmits, over the communication network 20, signals indicative that contents of a hot local storage device 150 and a cold local storage device 160 have been update, as it will be described in greater details herein further below. Needless to say, the communication network may be configured to transmit data objects between the user device 200, the server 100 and the virtual object storage service 300.

Servers

The servers 100 and 170 may be implemented as conventional computer servers. In an example of an embodiment of the present technology, each of the servers 100 and 170 may be implemented as a Dell™ PowerEdge™ Server running the Microsoft™ Windows Server™ operating system. Needless to say, each of the servers 100 and 170 may be implemented in any other suitable hardware, software, and/or firmware, or a combination thereof. In the depicted non-limiting embodiments of the present technology, each of the servers 100 and 170 is a single server. In alternative non-limiting embodiments of the present technology, the functionality of the server 100 and/or the functionality of the resource server 170 may be distributed and may be implemented via multiple servers. In other non-limiting embodiment of the present technology, the functionalities of the server 100 and 170 are implemented in a single server.

Generally speaking, the server 100 is configured to (i) generate a first copy, or "snapshot", on the cold local storage device 160, of the training dataset stored in the virtual object storage service 300, (ii) execute and/or causing an execution of modifications to data objects of the training dataset, (iv) listing said operations along with identification information of data objects subjected to said modifications and (v) generating a synchronized training dataset that mirrors the training dataset of the virtual object storage service 300 in the hot local storage device 150 such that the server 100, the resource server 170 and/or the user device 200 may access the synchronized training dataset.

As shown in FIG. 1, in this embodiment, the server 100 may comprise a processor 130 configured to manage access to the data objects by the user device 200. In some embodiments, the server 100 may comprise more than one processor 130. The server 100, in conjunction with the processor 130, is configured to manage data storage allocation between the hot and cold local storage devices 150, 160. In this embodiment, the processor 130 is further configured to receive signals from the user device 200. The server may be communicably connected to the virtual object storage service 300 via a dedicated communication link 310 such that, in use, information about modification of a content of the virtual object storage service 300 may be transmitted from the virtual object storage service 300 to the server 100. As such, the communication link 310 is referred to a "event bus" 310. More specifically, in this embodiment, the server 100 may generate a list of modifications of the training dataset stored in the virtual object storage service 300. The list of modifications may thus comprise indications of data objects of the training dataset that have been subjected to a modification (e.g. a WRITE operation). A new entry of the list is generated each time a modification is applied to one of the data objects of the training dataset in the virtual object storage service 300. Entries of the list may comprise, for example and without limitation, indication of a modification, indication of a data object on which the modification has been executed, a time reference of an execution of the modification. Entries of the list may comprise additional indications of modification and operations executed on the data objects of the training dataset stored in the virtual object storage service 300. The list of modifications may be, for example and without limitations, stored in an internal memory (not shown) of the server 100. An illustrative example of an extract of a list of modifications is presented herein below:

| Identifier | Operation | Date |
|---|---|---|
| #4845 | WRITE | 2021 Jan. 03 15:06:57 |
| #59345 | READ | 2021 Jan. 27 08:19:30 |
| #10059 | READ | 2021 Jan. 27 08:19:30 |
| #968 | DELETE | 2021 Apr. 02 18:00:45 |

In this illustrative example, indications of the data objects that were subjected to a modification are numeral identifier, each data object stored in the virtual object storage service 300 being attributed with a respective identifier. The identifier of a given data object may be comprised in the metadata of said data object. The list of modifications also comprises the type of modification and a date of execution of said modification. In this illustrative example, a WRITE operation has been executed on the data object identified as #4845 on Jan. 3, 2021 at 15:06:57. Similarly, READ operations have been simultaneously executed on the data objects identified as #59345 and #10059 on Jan. 27, 2021 at 08:19:30. Similarly, a DELETE modification has been executed on the data object identified as #968 on Apr. 2, 2021 at 18:00:45.

In this embodiment, the server 100 is communicably connected to the hot and cold local storage devices 150, 160 and comprises a storage driver 120 for executing instructions provided by the processor 220. For instance, the storage driver may be configured to write a data object in the hot local storage device 150 and/or in the cold local storage device 160 in response to receiving an instruction from the processor 130. The hot and cold local storage devices 150, 160 are depicted as separate entities from the server 100. However, it is contemplated that one or both of the hot and cold local storage devices 150, 160 may be implemented integrally with the server 100, without departing from the scope of the present technology. Alternatively, functionalities of the hot and cold local storage devices 150, 160 as described below may be distributed between more than one physical devices.

Generally speaking, the hot and cold local storage devices 150, 160 are configured to store data generated, retrieved and/or processed by the server 100 for temporary and/or permanent storage thereof. For example, the hot and cold local storage devices 150, 160 may be configured to store inter alia a copy of the training dataset. The hot and cold local storage devices 150, 160 may be implemented by any computer-readable medium, including magnetic or optical disks, optical memory, or other storage media suitable for receiving a copy of the training dataset. However, as previously highlighted, the hot local storage device 150 has higher storage performance than the cold local storage device 160 such that, in use, a retrieval latency for requesting and transferring, in response to the request, a data object from the hot local storage device 150 to the server 100 or to the user device 200 is lower than a retrieval latency for the same data object stored in the cold local storage device 160.

For example and without limitations, the hot local storage device may be any Non-Volatile Memory express (NVMe)-based drive from drive constructors such as SAMSUNG, SEAGATE, HITACHI, INTEL or any other constructor. Similarly, for example and without limitations, the cold local storage device 160 may be any Hard Disk Drive (HDD) or Solid-State Drive (SSD)-based drive from drive constructors such as SAMSUNG, SEAGATE, HITACHI, INTEL or any other constructor.

As it will be described in greater details herein further below, the hot and cold local storage devices 150, 160 may be used to store copies of the training dataset and/or synchronized copies of the training dataset stored by the virtual object storage service 300 such that the user device 200 and/or the server 100 may access and manage the training dataset with low latency.

In this embodiment, the server 100 may also comprise a snapshotting system 140 configured for generating snapshots of a content of the virtual object storage service 300. It can be said that a snapshot of the virtual object storage service 300 is a picture of a content thereof such that information about an organization of data objects is comprised in the snapshot. In the context of the present specification, a snapshot thus comprises information indicative of an organization of the training dataset and a content thereof. More specifically, a snapshot of the virtual object storage service 300 comprises the logic collection of bytes of each of the data objects stored therein along with a description, or reference markers, indicative of a content of the virtual object storage service 300. A snapshot may thus be used to reconstruct a content of the virtual object storage service 300 on another storage device such as the hot and cold local storage device 150, 160.

In this embodiment, the snapshotting system 140 may generate a snapshot of the virtual object storage service 300 upon a generation of the training dataset distributed thereacross. For example, a user of the user device 200 may execute an upload of data, thereby generating a corresponding training dataset in the virtual object storage service 300. The server 100 may automatically, or upon receiving agreement from the user, cause the snapshotting system 140 to generate a snapshot of the training dataset. In other instances, the snapshotting system 140 may be configured to generate snapshots of the training dataset at a predetermined frequency or upon detection by the server 100, based on information received from the event bus 310, that a number of operations applied to data objects of the training dataset is above a predetermined threshold.

In this embodiment, the resource server 170 may be locally connected to the server 100 and/or to the hot and cold local storage device 150, 160 via a communication link (not shown) distinct from the communication network 20. The resource server 170 comprises a dedicated processing unit 110 and a corresponding memory 112. The dedicated processing unit 110 may be configured to process data comprise in the memory 112. As an illustrative example and without limitations, the dedicated processing unit 110 may be used to train a machine learning model based on Machine Learning Algorithms (MLA). In a non-limiting embodiment, the dedicated processing unit 110 is a Graphics Processing Unit (GPU) 110 and the corresponding memory is a Video Random Access Memory (VRAM) 112. In this example, the memory 112 may be configured to receive, and store images of a training dataset for training the machine learning model. Other types of dedicated processing unit are contemplated in alternative embodiments such as Tensor Processing unit (TPU), Field-Programmable Gate Array (FPGA) circuitry, Central Processing Unit (CPU), or any other suitable processing unit. The training dataset may comprise the data objects stored in the virtual object storage service 300. Provision of said data objects to the memory 112 in accordance with some embodiments of the technology will be described in greater herein further below.

Even though the dedicated processing unit 110 and the memory 112 are depicted as remotely connected to the server 100 in FIG. 1, the dedicated processing unit 110 and the memory 112 may be part of the server 100. As another example, the dedicated processing unit 110 and the memory 112 may be part of the user device 200. In the illustrative example of FIG. 1, the dedicated processing unit 110 and the memory 112 are part of the resource server 170 such that the resource server 170 may be used a Virtual Machine (VM) by the user device 200. Therefore, in this example, the machine learning model may be trained on the resource server 170 instead of the user device 200 such that, in use, training data may not have to be transmitted to the user device 200.

Figure 3:
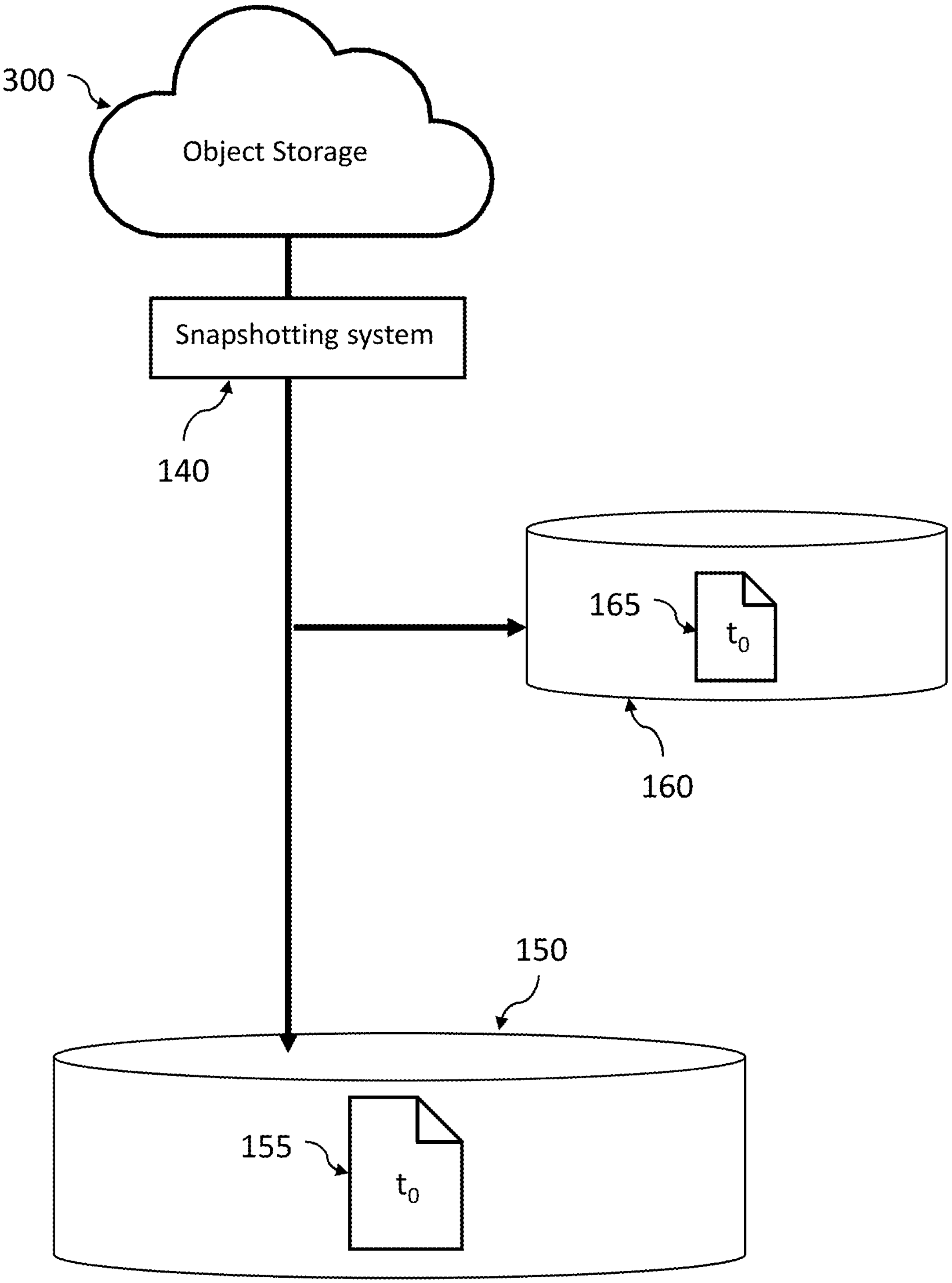
FIG. 3 is a schematic representation of a first synchronization of an object storage device on a data storage device in accordance with non-limiting embodiments of the present technology.

FIG. 3 is a schematic representation of a generation of a synchronized training dataset on the hot local storage device 150 based on the training dataset distributed across the virtual object storage service 300 in accordance with non-limiting embodiments of the present technology.

The server 100 may fetch the data objects of the training dataset from the virtual object storage service 300 and cause the snapshotting system 140 to generate a snapshot 165 of the training dataset of virtual object storage service 300, the snapshot 165 being associated with a temporal indication corresponding to the generation of the snapshot 165. In this embodiment, the snapshot 165 is further stored in the cold local storage device 160. In the illustrative example of FIGS. 3 and 4, the temporal indication is a time reference "to". As such, the organization of data objects of the training dataset in the virtual object storage service 300 at to is identical to an organization of data objects of the snapshot 165 in the cold local storage device 160. The snapshot 165 may thus serve as a backup copy of the training dataset.

Optionally, in at least one non-limiting embodiment, a second copy 155, or "second snapshot", training dataset of virtual object storage service 300 may be generated and stored in the hot local storage device 150 at to. In the same or another embodiment, generation of the snapshot 165 may be performed upon generation of the training dataset across the virtual object storage service 300.

In this illustrative embodiment, for generation of the first synchronized training dataset on the hot local storage device 150, the user device 200 may send a first signal to the server 100 and/or to the API gateway 305, the first signal being indicative of a request to access the training dataset for, for example, training a machine learning model based on the data objects using the dedicated processing unit 110. The server 100 may thus fetch the data object of the training dataset from the virtual object storage service 300 and cause the storage driver 120 to store the fetched data objects (i.e. the snapshot 165) in the cold local storage device 160 and generating another copy 155 of the training dataset in the hot local storage device 150 such that the server 100 may provide access of the copy 155 to the user device 200. The user may thus access the copy 155 mirroring the current training dataset using high performance low latency storage capabilities of the hot local storage device 150. Hence, in this example, as the copy 155 is generated in response to the signal received from the user device 200, the copy 155 can be said to be a "up-to-date" copy of the training dataset, or a "synchronized training dataset" 155. It should be understood that the user device 200 is not direct provided with the training dataset of the virtual object storage service 300 but rather with the synchronized training dataset 155 stored on the hot local storage device 150.

In one embodiment, the synchronized training dataset 155 may be deleted from the hot local storage device 150 upon receiving, by the server 100, of a signal indicative that the user device 200 does not require immediate access to the synchronized training dataset 155. For example and without limitation, once a training of the machine learning model based on the data objects of the synchronized training dataset 155 is complete, or once the user device 200 emits a signal indicative that the training is interrupted, the synchronized training dataset 155 may be deleted from the hot local storage device 150. This may enable, for example, another user to use the high performance low latency storage capabilities of the hot local storage device 150 to access other data objects that may be stored therein once the synchronized training dataset 155 has been deleted.

Generation of the synchronized training dataset 155 may be a time-consuming process for high amount of data objects comprised in the training dataset. To avoid such time-consuming process for other access to the training dataset, subsequent requests for accessing the content of the training dataset may cause the server 100 to synchronize the synchronized training dataset 155 with the training dataset on the hot local storage device 150 based on the snapshot 165, the list of modifications and data objects distributed across the virtual object storage service 300 as it will be described further below.

Figure 4:
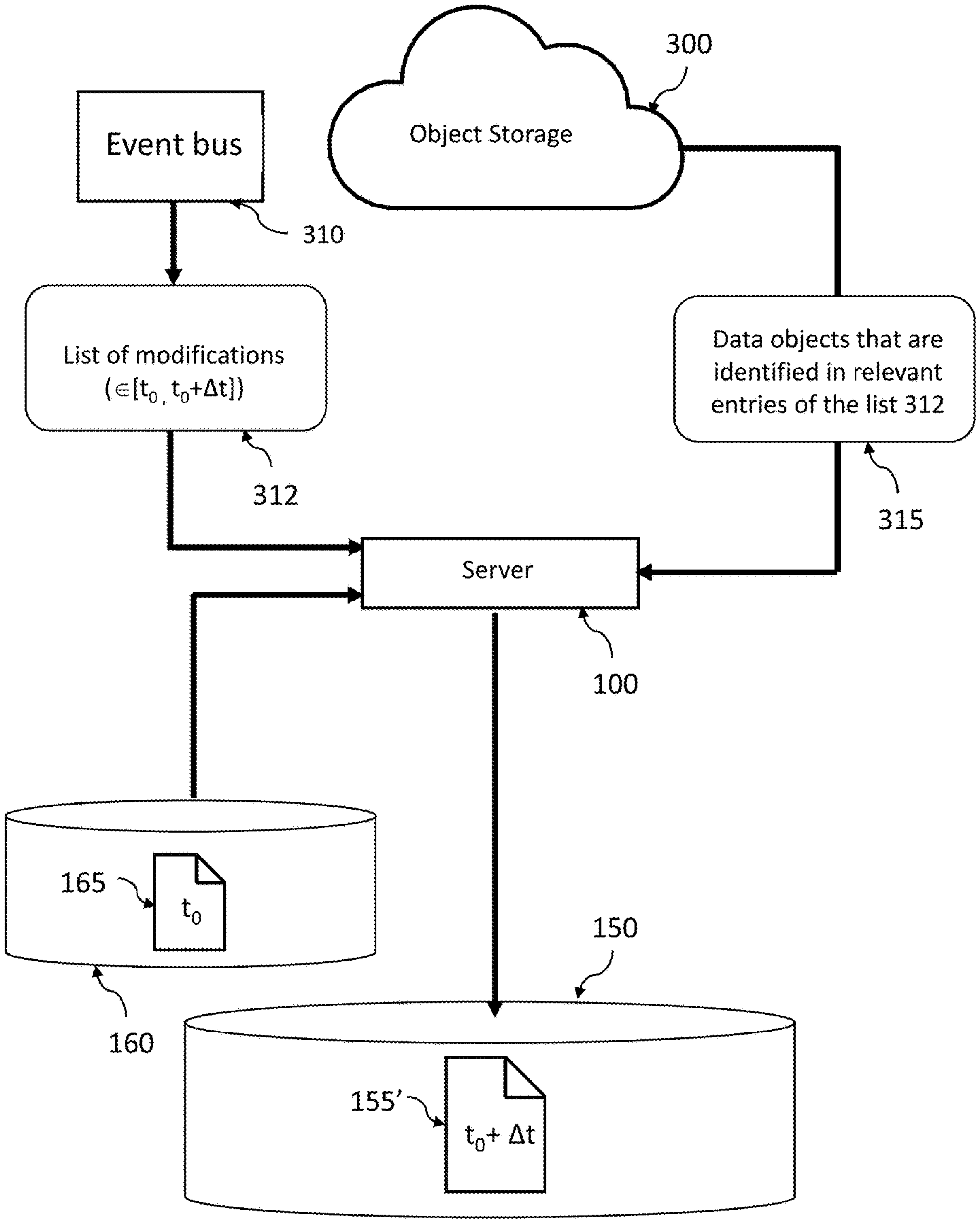
FIG. 4 is a schematic representation of a subsequent synchronization of an object storage device on a data storage device in accordance with non-limiting embodiments of the present technology.

FIG. 4 is a schematic representation of a synchronization of the synchronized training dataset 155 on the hot local storage device 150 in accordance with non-limiting embodiments of the present technology. In a non-limiting embodiment, a synchronization of the synchronized training dataset 155 may correspond to a generation of a copy 155' of the training dataset in the hot local storage device 150 as it will be described herein further below. As such, the synchronized training dataset 155 will be referred to as the synchronized training dataset 155' hereinafter. In this embodiment, the generation of the copy 155' results from reception, by the server, of a second signal emitted by the user device 200 via the communication network 20. Upon receiving said signal, the server 100 may cause the storage driver 120 to synchronize the synchronized training dataset 155' in the hot local storage device 150 such that the synchronized training dataset 155' is an "up-to-date" copy of the training dataset. In this example, the user device 200 thus transmits a signal indicative of a desire of the user to access the training dataset to the server 100, which cause a synchronization of the synchronized training dataset 155' (i.e. a generation of the synchronized copy 155') to be accessed by the user device 200. The copy 155' is generated on the hot local storage device such that the user may access the synchronized copy 155' with the high performance low latency storage capabilities of the hot local storage device 150.

To do so, the server 100 may be configured to access the latest snapshot 165 (identified as having been generated at to in the example of FIGS. 3 and 4) and the list of modifications 312. The server 100 may use an offset handler system (not shown) for identifying relevant entries of the list of modifications 312. In this embodiment, the relevant entries are associated with time indicators indicating that a corresponding modification has been executed after the generation of the latest snapshot 165. In other words, the generation of the latest snapshot 165 defines a time offset (e.g. $t_0$), and relevant entries of the list of modifications 132 are entries that have been generated by the event bus 310 after the time offset and until generation of the copy 155' (e.g. between $t_0$ and $t_0+\Delta t$). For instance, if determination is made that the latest snapshot 165 was generated on Jan. 4, 2021 at 15:54:03, only entries of the list that are associated with a time indicators indicating that a corresponding operation was executed later than Jan. 4, 2021 at 15:54:03 may be identified as relevant entries. It can be said that the relevant entries of the list are comprised in a portion of the list of modifications, the relevant entries being indicative of operations executed after the generation of the latest snapshot 142.

In this embodiment, the server 100 is configured to copy the latest snapshot 165 as a whole from the cold local storage device 160 to the hot local storage device 150. The server 100 is further configured to modify said copy of the latest snapshot 165 in the hot local storage device 150 based on the relevant entries of the list of modifications 312. As such, it can be said that the modifications corresponding to the relevant entries of the list of modifications 312 are "replayed" on the copy the latest snapshot 165 in the hot local storage device 150, thereby forming the synchronized training dataset 155'. For example, if a relevant entry indicates that a given data object having a given identifier has been deleted from the virtual object storage service 300, the server 100 may delete the corresponding data object of the synchronized training dataset 155' having a same identifier on the hot local storage device 150. As another example, if a relevant entry indicates that a given data object having a given identifier has been modified (e.g. WRITE operation) in the virtual object storage service 300, the relevant entry comprising indications of executed commands to modify the given data object, the server 100 may retrieve and execute the executed commands onto the corresponding data object of the synchronized training dataset 155' having a same identifier on the hot local storage device 150, such that the synchronized training dataset 155' is an "up-to-date version of the training dataset.

In another embodiment, based on the relevant entries, the server 100 may identify and fetch a first set of data objects 315 in the virtual object storage service 300 that have been recently subjected to a modification. More specifically, the first set of data objects 315 comprises data objects whose identifiers are identified in one or more of the relevant entries of the list of modifications 312. Once the copy the latest snapshot 165 is stored in the hot local storage device 150, the server 100 may cause the storage driver 120 to replace one or more data objects of said copy with data objects retrieved from the virtual object storage service 300. More specifically, data objects stored in the hot local storage device 150 and that correspond to relevant entries of the list of modifications 312 may be replaced by respective data objects of the first set of data objects 315. In this embodiment, the server 100 may fetch the first set of data objects by requesting access to the first set of data objects 315 to the API gateway 305. The server 100 may further store the first set of data objects 315 in the hot local storage device 150 by, for example, causing the storage driver 120 to generate a copy of each data objects of the first set of data objects 315 in the hot local storage device 150. As such, data objects of the copy the latest snapshot 165 in the hot local storage device 150 and the have been modified since generation of the latest snapshot 165 are replaced by their corresponding "up-to-date" versions retrieved from the virtual object storage service 300. The synchronized training dataset 155' is thus generated.

In yet another non-limiting embodiment, in order to generate the synchronized training dataset 155, the server 100 may identify and fetch a second set of data objects in the cold local storage device 160 that are not identified in relevant entries of the list of modification 312 instead of copying the latest snapshot 165 as a whole from the cold local storage device 160 to the hot local storage device 150. The server 100 may store the fetched second set of data objects in the hot local storage device 150 so as to concatenate the first set of data objects 315 with the second set. As such, the first and second sets of data objects form the synchronized training dataset 155' that mirrors the current training dataset distributed across the virtual object storage service 300. It can thus be said that the synchronized training dataset 155' is an "up-to-date" copy of the training dataset and that it is synchronized, upon request of the user in this example, in the hot local storage device 150 such that the user may benefit from high performance low latency storage capabilities of the hot local storage device 150. In this embodiment, fetching and storing the second set of data objects 168 from the cold local storage device 160 to the hot local storage device 150 may be executed faster than fetching and storing corresponding data objects (i.e. having a same identifier for example) from the virtual object storage service 300 to the hot local storage device 150 due to processing time of the communication network 20 and the API gateway 305. Fetching the first and second sets of data objects may be executed sequentially or in parallel.

In this embodiment, the server 100 may process a plurality of training datasets in parallel. More specifically, the server 100 may cause generation of copies of each training dataset in the cold local storage device 160 or another cold local storage device (not shown) communicably connected to the server 100. As such, the server 100 may maintain a list of modifications for each training dataset such that synchronized copies of the training datasets may be generated on the hot local storage device 150, as it will be described in greater details herein further below.

Figure 5:
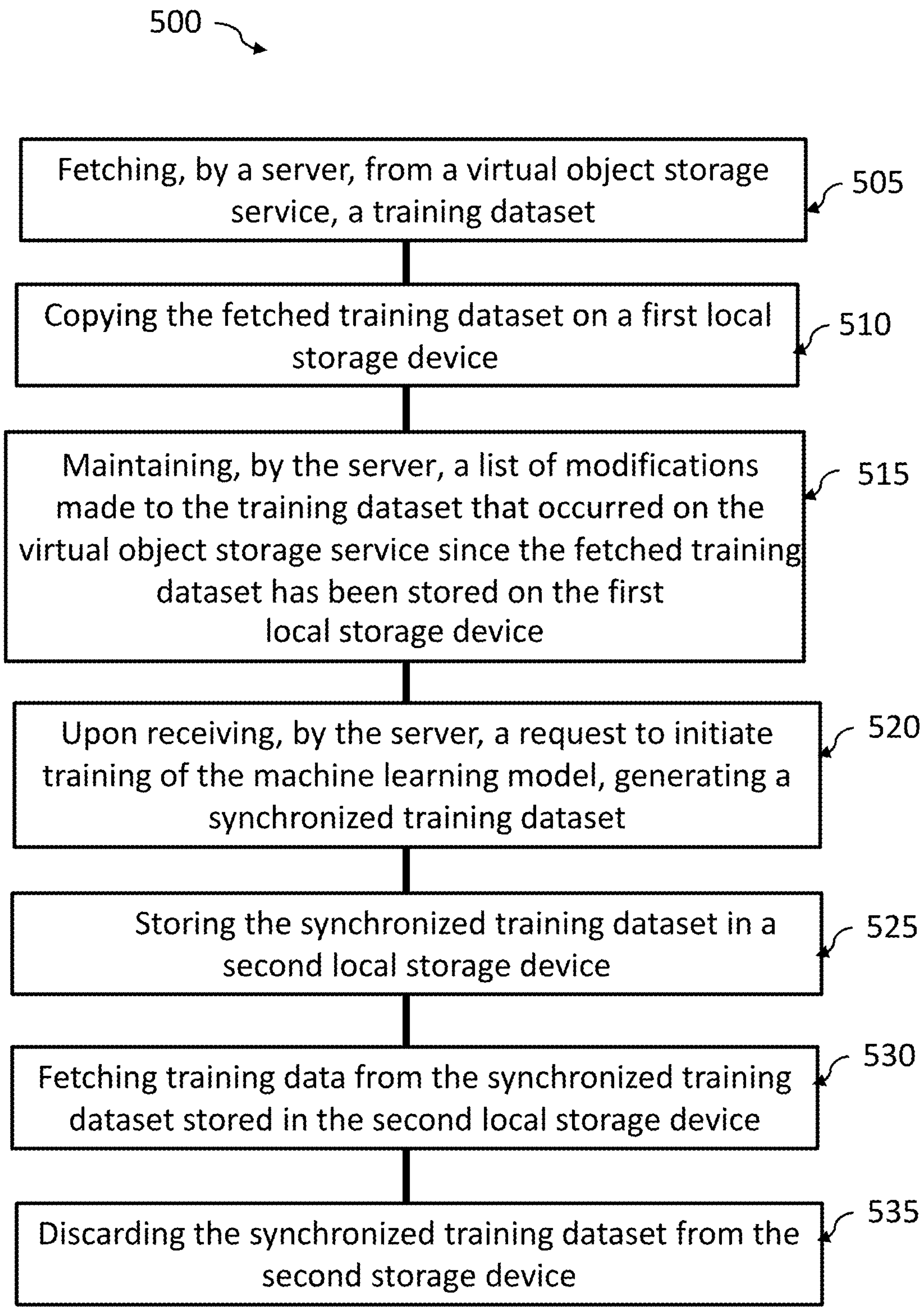
FIG. 5 illustrates a flow diagram showing operations of a method for training a machine learning model in accordance with non-limiting embodiments of the present technology.

FIG. 5 is a flow diagram of a method 500 for training a machine learning model based on a training dataset, the training dataset being formed by data objects distributed across a virtual object storage service according to some embodiments of the present technology. In one or more aspects, the method 500 or one or more steps thereof may be performed by a processor or a computer system, such as the server 100. The method 500 or one or more steps thereof may be embodied in computer-executable instructions that are stored in a computer-readable medium, such as a non-transitory mass storage device, loaded into memory and executed by a CPU. Some steps or portions of steps in the flow diagram may be omitted or changed in order. Although the method 500 relates to a training of a machine learning model, steps of the method may be performed for other purposes such as, in a broad aspect, providing a user device with an access to a dataset with reduced data retrieval latency.

At step 505, the server 100 fetches the training dataset from the virtual object storage service 300. More specifically, the server 100 may transmit signal indicative of a request for retrieving each data object of the training dataset to the gateway 305. For example, the server may transmit N requests to the gateway, where N is the number of data objects comprised in the training dataset distributed across the virtual object storage service 300.

At step 510, the server 100 copies the fetched training dataset (i.e. the N data objects in this example) on the cold local storage device 160 communicably connected to the server 100. To do so, the server 100 may cause the snapshotting system 140 to generate the snapshot 165 of the training dataset distributed across the virtual object storage service 300, the snapshot 165 being associated with a time reference indicative of the generation of the snapshot 165 such that the snapshot 165 may be used as a reference for the organisation of the training dataset in later steps. The snapshot 165 is further stored in the cold local storage device 160.

At step 515, the server maintains the list of modifications 312 such that the modifications executed on the data object of the training dataset are indicated by entries of the list of modifications 312. More specifically, the event bus 310 may provide the server 100 with information indicative of modifications executed on the training dataset distributed across the virtual object storage service 300.

At this step, upon receiving, by the server 100, a WRITE operation from the user device 200, the server 100 may transmit a corresponding WRITE signal comprising first information indicative of a modification of a given data object of the training dataset. Said first information may comprise a first identifier of the given data object and instructions for a modification of the data object. The server 100 may store the first identifier in a local memory (not shown) communicably connected to the server 100. The first information is further transmitted by the server 100 to the virtual object storage service 300 via, for example, the gateway 305, thereby causing an execution of the WRITE operation of the data object by the virtual object storage service 300. The server 100 may receive, via the event bus 310, second information about the modification executed by the virtual object storage service 300. A new entry of the list of modification 312 may thus be generated based on the second information. More specifically, the second information may comprise a second identifier of the data objects on which the modification has been executed. The server 100 may further compare the first and second identifier to determine whether the modification has been successfully executed on the given data object. If determination is made by the server 100 that the first and second identifiers are identical, an acknowledge signal may be emitted by the server 100 to the user device 200 to indicate that the given data object has been modified. Similarly, if determination is made by the server 100 that the first and second identifiers are different, a signal may be emitted by the server 100 to the user device 200 to indicate that the WRITE operation of the given data object has failed.

In a non-limiting embodiment, the server 100 may cause the snapshotting system 140 to update the snapshot 165 by, for example, generating a new snapshot 165 of the training dataset distributed across the virtual object storage service 300. Updating the snapshot 142 may be executed by the server 100 at a predetermined frequency and/or in result of a number of entries in the list of modifications 312 being above a predetermined threshold. For example and without limitation, the server 100 may cause the snapshotting system to update the snapshot 165 when determination is made that the list of modifications 312 comprises more than 10,000 entries. Upon updating the snapshot 142, the entries of the list of modifications 312 having been generated before the update of the snapshot 165 may be discarded. It can thus be said that the list of modifications 312 is reset.

At step 520, upon receiving a request to initiate training of the machine learning model from, for example, the user device 200, the server 100 may generate the synchronized training dataset 155' based on the snapshot 165 and the list of modifications 312. In this embodiment, the server 100 is configured to copy the latest snapshot 165 as a whole from the cold local storage device 150 to the hot local storage device 150. The server 100 may further modify said copy of the latest snapshot 165 in the hot local storage device 150 based on the relevant entries of the list of modifications 312. As such, it can be said that the modifications corresponding to the relevant entries of the list of modifications 312 are "replayed" on the copy the latest snapshot 165 in the hot local storage device 150, thereby forming the synchronized training dataset 155'.

In a broad aspect, the server 100 may receive a request to access the dataset from the user device 200 and generate the synchronized training dataset 155' based on the snapshot 165 and the list of modifications 312 in response to receiving said request.

In a non-limiting embodiment, the server 100 may identify and fetch the first set of data objects 315 from the virtual object storage service 300. More specifically, the first set of data objects 315 comprises data objects whose identifiers are identified in one or more of the relevant entries of the list of modifications 312, the relevant entries being entries generated after a latest update of the snapshot 142. The server 100 may use the snapshot 165 stored the cold local storage device 160 to the hot local storage device 150, and update data object of said copy that are identified in the relevant entries of the list of modification 312 by corresponding data objects from the first set of data objects 315, thereby generating the synchronized training dataset 155'.

Alternatively, in yet another embodiment, at this step, instead of copying the entirety of the snapshot 165 from the cold local storage device 160 to the hot local storage device 150, the server 100 may identify and fetch the second set of data objects in the cold local storage device 160 that are not identified in relevant entries of the list of modification 312. The server 100 may store the fetched first and second sets of data objects in the hot local storage device 150. As such, the first and second sets of data objects form the synchronized training dataset 155' that mirrors the current training dataset distributed across the virtual object storage service 300.

In this embodiment, the server 100 may perform steps of the method 500 from step 505 to step 520 for a plurality of training datasets, a copy of each training dataset of the plurality of training datasets being generated on the cold local storage device 160. The server 100 may thus maintain a list of modification as described hereinbefore for each training dataset. A plurality of requests to initiate training of machine learning models may be received at step 520 by other user devices (not shown) different from the user device 200 and communicably connected to the server 100, thereby causing the server 100 to generate a plurality of corresponding synchronized training datasets.

At step 525, the server 100 may cause the storage driver 120 to store the synchronized training dataset 155' in the hot local storage device 150.

In one embodiment, the server 100 may receive a WRITE operation from the user device 200 after having caused the storage driver 120 to store the synchronized training dataset 155' in the hot local storage device 150. As previously described, the server 100 may transmit a corresponding WRITE signal comprising information indicative of a modification of a given data object of the training dataset to the virtual object storage service 300. Said information may comprise an identifier of the given data object and instructions for a modification of the data object. The server 100 may store the identifier in a local memory (not shown) communicably connected to the server 100. Subsequently or in parallel to transmitting the information to the virtual object storage service 300, the server 100 may execute instructions comprised therein thereby causing the storage driver 120 to modify a given data object having the first identifier in the hot local storage device 150. The server 100 may thus cause concurrent modifications of one data object in the virtual object storage service 300 and one data object in the hot local storage device 150, the two data objects having a same identifier. In this embodiment, if determination is made by the server 100 that identifiers of said two data objects are identical, an acknowledge signal may be emitted by the server 100 to the user device 200 to indicate that a "live-update" has been executed on the synchronized training dataset 155'.

At step 530, the resource server 170 may fetch training data (i.e. data objects) of the synchronized training dataset 155' to execute a training of the machine learning model. In this embodiment, the training data are transmitted to the memory 112 of the dedicated processing unit 110 such they may be processed by the dedicated processing unit 110 to train the machine learning model.

In a broad aspect, the server 100 provides the resource server 170 and/or the user device 200 with access to the synchronized training dataset 155' stored on the hot local storage device 150. As such the dataset may fetched by the resource server 170 and/or the user device 200 with reduced data retrieval latency.

In at least some embodiments, the method 500 could further include, at step 535, generating and storing a second synchronized training dataset on the hot local storage device 150. The method 500 may comprise, at this step, discarding, by the server 100, the synchronized training dataset 155' from the hot local storage device 150, for example, once the training is complete or interrupted by reception by the server 100 of a signal indicative of an interruption of the training from the user device 200. Indeed, the memory of the hot local storage device 150 may not be suitable for storing the synchronized training dataset 155' along the second synchronized training dataset. As such, the server 100 may fetch and store another synchronized training dataset on the hot local storage device 150 for training of another machine learning model for example.

While the above-described implementations have been described and shown with reference to particular steps performed in a particular order, it will be understood that these steps may be combined, sub-divided, or re-ordered without departing from the teachings of the present technology. At least some of the steps may be executed in parallel or in series. Accordingly, the order and grouping of the steps is not a limitation of the present technology.

It should be expressly understood that not all technical effects mentioned herein need to be enjoyed in each and every embodiment of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A method for training a machine learning model based on a training dataset, the training dataset being formed by data objects distributed across a virtual object storage service, the method being executable by a server configured to access the virtual object storage service, the method comprising:

fetching, by the server, from the virtual object storage service, the training dataset;

copying the fetched training dataset on a first local storage device, the first local storage device being communicably connected to the server;

maintaining, by the server, a list of modifications executed on the training dataset that occurred on the virtual object storage service since the fetched training dataset has been stored on the first local storage device, each entry of the list of modifications comprising an identifier of a data object of the training dataset, a type of modification made to the data object and a temporal indication associated with a modification made to the data object;

after receiving, by the server, a request to initiate training of the machine learning model, generating a synchronized training dataset by applying the list of modifications to the fetched training dataset, the synchronized training dataset mirroring the training dataset stored in the virtual object storage service;

storing the synchronized training dataset in a second local storage device, the second local storage device being communicably connected to the server, the second local storage device having a lower data retrieval latency than the first local storage device; and fetching training data from the synchronized training dataset stored in the second local storage device as the training of the machine learning model is executed.

2. The method of claim 1, wherein generating the synchronized training dataset comprises:

identifying, by the server, based on the list of modifications, a first set of data objects of the training dataset, the data objects of the first set of data objects having been subject to a modification since the storing of the fetched training dataset in the first local storage device;

identifying, by the server, based on the list of modifications, a second set of data objects of the training dataset, the data objects of the second set of data objects having not been subject to a modification since the storing of the fetched training dataset in the first local storage device;

fetching the first set of data objects from the virtual object storage service;

fetching the second set of data objects from the first local storage device; and storing the synchronized training dataset in a second local storage device comprises:

storing the fetched first and second set of data objects in the second local storage device.

3. The method of claim 1, wherein generating the synchronized training dataset comprises:

identifying, by the server, based on the list of modifications, a first set of data objects of the training dataset, the data objects of the first set of data objects having been subject to a modification since the storing of the fetched training dataset in the first local storage device;

executing, by the server, modifications of the list of modifications that correspond to relevant entries of the list of modifications on corresponding data objects of a copy of the fetched training dataset, the relevant entries being indicative of modifications executed after storing the fetched training dataset in a first local storage device.

4. The method of claim 1, wherein the modifications are CREATE operations, indicative of a creation, by the server, of a new data object in the training dataset, WRITE operations, indicative of a modification, by the server, of one of the data objects of the training dataset, READ operations, indicative of a retrieval, by the server, of one of the data objects of the training dataset, DELETE operations, indicative of a deletion, by the server, of one of the data objects of the training dataset, or a combination thereof.

5. The method of claim 1, wherein subsequent to executing the training of the machine learning model, the method further comprises discarding the synchronized training dataset from the second local storage device.

6. The method of claim 5, wherein the machine learning model is a first machine learning model, the training dataset is a first training dataset, the synchronized training dataset is a first synchronized training dataset, and the list of modifications is a first list of modifications, and the virtual object storage service comprises second data objects distributed thereacross forming a second training dataset, the method further comprising, subsequent to discarding the synchronized training dataset from the second local storage device:

fetching, by the server, from the virtual object storage service, the second training dataset;

storing the fetched second training dataset in the first local storage device, the first local storage device being communicably connected to the server;

maintaining, by the server, a second list of modifications executed on the second training dataset distributed across the virtual object storage service that occurred since the fetched second training dataset has been stored on the first local storage device, each entry of the second list of modifications comprising at least one of an identifier of a data object of the second training dataset, a type of modification made to said data object and/or a temporal indication associated with a modification made to said data object;

upon receiving, by the server, a request to initiate training of a second machine learning model, generating a second synchronized training dataset based on the fetched second training dataset and the second list of modifications, the second synchronized training dataset mirroring the second training dataset stored in the virtual object storage service;

subsequently to discarding the first synchronized training dataset from the second storage device, storing the second synchronized training dataset in the second local storage device; and fetching training data from the second synchronized training dataset stored in the second local storage device as the training of the second machine learning model is executed.

7. The method of claim 6, wherein the training of the first machine learning model is executed in response to receiving, by the server, a first request signal from a first user device associated with a first user, and the training of the second machine learning model is executed in response to receiving, by the server, a second request signal from a second user device associated with a second user.

8. The method of claim 1, wherein the server and the virtual object storage service are communicably connected to a user device associated with a user, the generation of the synchronized training dataset on the second storage device resulting from reception, by the server, of a request signal for training the machine learning model emitted by the user device.

9. The method of claim 8, wherein the user device is a plurality of user devices, each user device being associated with a distinct user and a corresponding training dataset distributed across the virtual object storage service.

10. The method of claim 1, wherein each data object of the training dataset distributed across the virtual object storage service is associated with an identifier, and maintaining, by the server, a list of modifications executed on the training dataset comprises:

transmitting, from the server to the virtual object storage service, a WRITE signal comprising information indicative of a modification by a user device of a data object of the training dataset, the user device being communicably connected to the server, the information comprising a first identifier of the data object;

storing, by the server, the first identifier of the data object in a memory communicably connected to the server;

transmitting, by the server, instructions causing the virtual object storage service to execute a modification of the data object based on the information of the WRITE signal;

receiving, by the server from the virtual object storage, data comprising information about a second identifier of a data object on which the modification is executed;

generating, by the server, a new entry in the list of modifications, the new entry being indicative of the second identifier of the data object and the information of the WRITE signal;

if determination is made, by the server, that the first and second identifiers are identical, transmitting an acknowledge signal to the user device indicative of a successful modification of the data object.

11. The method of claim 1, wherein fetching, by the server, from the virtual object storage service, the training dataset comprises generating a snapshot of the virtual object storage service, and storing the fetched training dataset in the first local storage device comprises storing the snapshot in the first local storage device, the list of modifications being indicative of modifications executed on the training dataset distributed across the virtual object storage service since the generation of the snapshot.

12. The method of claim 11, wherein the snapshot is updated at a predetermined frequency by generating a new snapshot of the training dataset.

13. The method of claim 1, wherein the training of the machine learning model is executed by a processing unit communicably connected to a memory configured for receiving the fetched synchronized training dataset, the memory being communicably connected to the second local storage device.

14. A non-transitory computer-readable medium comprising computer-readable instructions that, upon being executed by a system, cause the system to perform the method of claim 1.

15. A server for training a machine learning model based on a training dataset, the training dataset being formed by data objects distributed across a virtual object storage service, the server being configured to access the virtual object storage service, the server comprising a processor and a memory configured to store instructions which, upon being executed by the processor, cause the server to:

fetch, from the virtual object storage service, the training dataset;

copy the fetched training dataset on a first local storage device, the first local storage device being communicably connected to the server;

maintain a list of modifications executed on the training dataset that occurred on the virtual object storage service since the fetched training dataset has been stored on the first local storage device, each entry of the list of modifications comprising an identifier of a data object of the training dataset, a type of modification made to the data object and a temporal indication associated with a modification made to the data object;

after receiving a request to initiate training of the machine learning model, generate a synchronized training dataset by applying the list of modifications to the fetched training dataset, the synchronized training dataset mirroring the training dataset stored in the virtual object storage service;

store the synchronized training dataset in a second local storage device, the second local storage device being communicably connected to the server, the second local storage device having a lower data retrieval latency than the first local storage device; and fetch training data from the synchronized training dataset stored in the second local storage device as the training of the machine learning model is executed.

16. The server of claim 15, wherein the server is further configured to, in order to generate the synchronized training dataset:

identify, based on the list of modifications, a first set of data objects of the training dataset, the data objects of the first set of data objects having been subject to a modification since the storing of the fetched training dataset in the first local storage device;

identify, based on the list of modifications, a second set of data objects of the training dataset, the data objects of the second set of data objects having not been subject to a modification since the storing of the fetched training dataset in the first local storage device;

fetch the first set of data objects from the virtual object storage service; and fetch the second set of data objects from the first local storage device;

the server being further configured to, in order to store the synchronized training dataset in the second local storage device:

store the fetched first and second set of data objects in the second local storage device.

17. The server of claim 15, wherein the server is further configured to, in order to generate the synchronized training dataset:

identify, based on the list of modifications, a first set of data objects of the training dataset, the data objects of the first set of data objects having been subject to a modification since the storing of the fetched training dataset in the first local storage device;

execute, modifications of the list of modifications that correspond to relevant entries of the list of modifications on corresponding data objects of a copy of the fetched training dataset, the relevant entries being indicative of modifications executed after storing the fetched training dataset in a first local storage device.

18. The server of claim 15, wherein the server is further configured to, subsequent to executing the training of the machine learning model, discard the synchronized training dataset from the second local storage device.

19. The server of claim 18, wherein the machine learning model is a first machine learning model, the training dataset is a first training dataset, the synchronized training dataset is a first synchronized training dataset, and the list of modifications is a first list of modifications, and the virtual object storage service comprises second data objects distributed thereacross forming a second training dataset, the server being further configured to, subsequent to discarding the synchronized training dataset from the second local storage device:

fetch, from the virtual object storage service, the second training dataset;

store the fetched second training dataset in the first local storage device, the first local storage device being communicably connected to the server;

maintain, a second list of modifications executed on the second training dataset distributed across the virtual object storage service that occurred since the fetched second training dataset has been stored on the first local storage device, each entry of the second list of modifications comprising at least one of an identifier of a data object of the second training dataset, a type of modification made to said data object and/or a temporal indication associated with a modification made to said data object;

upon receiving a request to initiate training of a second machine learning model, generate a second synchronized training dataset based on the fetched second training dataset and the second list of modifications, the second synchronized training dataset mirroring the second training dataset stored in the virtual object storage service;

subsequently to discarding the first synchronized training dataset from the second storage device, store the second synchronized training dataset in the second local storage device; and fetch training data from the second synchronized training dataset stored in the second local storage device as the training of the second machine learning model is executed.

20. A method for providing a user device with access to a dataset, the dataset being formed by data objects distributed across a virtual object storage service, the method being executable by a server communicably connected to the user device and configured to access the virtual object storage service, the method comprising:

fetching, by the server, from the virtual object storage service, the dataset;

copying the fetched dataset on a first local storage device, the first local storage device being communicably connected to the server;

maintaining, by the server, a list of modifications executed on the dataset distributed across the virtual object storage service that occurred since the fetched dataset has been stored on the first local storage device, each entry of the list of modifications comprising an identifier of a data object of the dataset, a type of modification made to the data object and a temporal indication associated with a modification made to the data object;

after receiving, by the server from the user device, a request to access the dataset, generating a synchronized dataset by applying the list of modifications to the fetched dataset, the synchronized dataset mirroring the dataset stored in the virtual object storage service;

storing the synchronized dataset in a second local storage device; and fetching data from the synchronized dataset stored in the second local storage device as the access to the dataset is provided to the user device.

* * * * *